(12) United States Patent
Cho et al.

(10) Patent No.: US 11,183,736 B2
(45) Date of Patent: Nov. 23, 2021

(54) COMPOSITE SEPARATOR FOR SECONDARY BATTERY

(71) Applicants: SK INNOVATION CO., LTD., Seoul (KR); SK IE TECHNOLOGY CO., LTD., Seoul (KR)

(72) Inventors: Kyu Young Cho, Daejeon (KR); Won Sub Kwack, Daejeon (KR); Yun Bong Kim, Daejeon (KR); Hye Jin Kim, Daejeon (KR); Su Ji Lee, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 0 days.

(21) Appl. No.: 16/459,334

(22) Filed: Jul. 1, 2019

(65) Prior Publication Data

US 2020/0006733 A1 Jan. 2, 2020

(30) Foreign Application Priority Data

Jul. 2, 2018 (KR) .................. 10-2018-0076318

(51) Int. Cl.
*H01M 50/446* (2021.01)
*H01M 50/449* (2021.01)
*H01M 10/0525* (2010.01)

(52) U.S. Cl.
CPC ....... *H01M 50/446* (2021.01); *H01M 50/449* (2021.01); *H01M 10/0525* (2013.01)

(58) Field of Classification Search
None
See application file for complete search history.

(56) References Cited

U.S. PATENT DOCUMENTS

2018/0053963 A1† 2/2018 Tanaka

FOREIGN PATENT DOCUMENTS

| EP | 1643583 | | 4/2006 |
|---|---|---|---|
| JP | 2016-024866 | | 2/2016 |
| JP | 2016184467 | A | 10/2016 |
| KR | 10-2014-0069201 | A | 6/2014 |
| KR | 10-2014-0070219 | | 6/2014 |
| KR | 10-2014-0144182 | A | 12/2014 |
| KR | 10-2016-0012083 | A | 2/2016 |
| KR | 10-2016-0030112 | A | 3/2016 |
| KR | 10-2016-0030891 | A | 3/2016 |
| KR | 10-2016-0061165 | A | 5/2016 |
| KR | 10-2016-0078967 | A | 7/2016 |
| KR | 10-2017-0039620 | A | 4/2017 |
| KR | 10-2017-0044640 | A | 4/2017 |
| KR | 10-2017-0102876 | A | 9/2017 |
| KR | 20180003177 | A1 † | 1/2018 |
| WO | 2005/011043 | | 2/2005 |

OTHER PUBLICATIONS

Extended Search Report Issued by European Patent Office dated Sep. 26, 2019.

† cited by third party

*Primary Examiner* — Carmen V Lyles-Irving
(74) *Attorney, Agent, or Firm* — IP & T Group LLP

(57) ABSTRACT

Provided are a composite separator and an electrochemical device using the same. More specifically, provided is a composite separator including a coating layer for improving an adhesive property between an electrode and a separator.

10 Claims, 1 Drawing Sheet

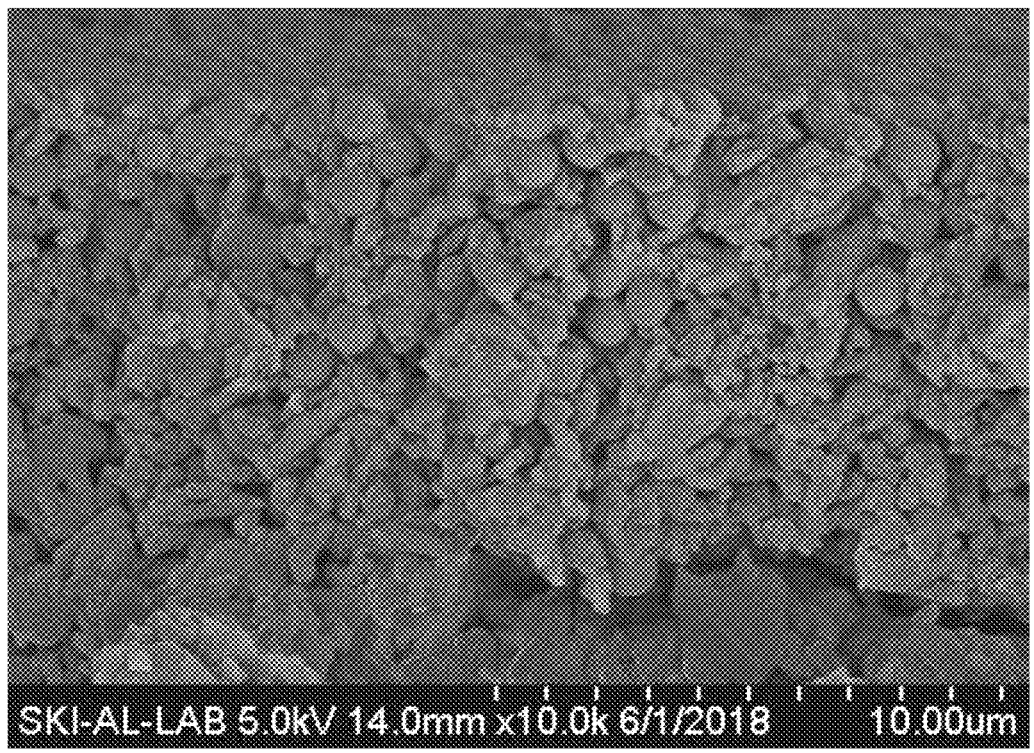

COMPOSITE SEPARATOR FOR SECONDARY BATTERY

CROSS-REFERENCE TO RELATED APPLICATIONS

This application claims priority under 35 U.S.C. § 119 to Korean Patent Application No. 10-2018-0076318, filed on Jul. 2, 2018, in the Korean Intellectual Property Office, the disclosure of which is incorporated herein by reference in its entirety.

TECHNICAL FIELD

The following disclosure relates to a composite separator and an electrochemical device using the same. More specifically, the following disclosure relates to a composite separator including a coating layer for improving an adhesive property between an electrode and a separator.

BACKGROUND

Recently, a secondary battery having high capacity and a large size, which is applied to an electric automobile, or the like, has been developed. As a part of the development, an electrode-separator assembly technique in which an electrode and a separator are laminated and integrated has been used.

However, this type of electrode-separator assembly may cause a lifting phenomenon in the preparation or during the use. In addition, there is a problem that the efficiency is deteriorated, for example failing to achieve a desired high capacity due to problems such as these factors act in a complex manner, resulting in distortion, or the secondary battery is difficult to enlarge due to the occurrence of twisting, or the like.

SUMMARY

An embodiment of the present invention is directed to providing a composite separator in which when heat and pressure are applied during the integration process of an electrode and a separator, a fusing force between the electrode and the separator is excellent, such that no lifting phenomenon on an electrode surface and a separator surface occurs.

Another embodiment of the present invention is directed to providing a composite separator in which in the preparation of the composite separator, slipperiness with the electrode is improved, such that assemblability between the electrode surface and the separator is improved, the composite separator is easily seated on an electrode surface due to slipperiness, or the like upon assembly, such that no wrinkles occur, and a coating layer, which does not cause distortion or a lifting phenomenon between the electrode and the separator, is also included.

Still another embodiment of the present invention is also directed to providing a composite separator having an effect of reducing pores between an electrode and a separator and having lifetime improvement through prevention of a lifting phenomenon and easy alignment.

Yet still another embodiment of the present invention is directed to providing a composite separator capable of producing a battery having cycle characteristics and achieving a desired high capacity.

Yet still another embodiment of the present invention is directed to providing a composite separator which sufficiently gives the above-described characteristics without significantly lowering permeability of a separator.

Yet still another embodiment of the present invention is directed to providing a composite separator in which the occurrence of shrinkage is reduced and a blocking phenomenon between coating layers may be improved upon winding a prepared product.

In one general aspect, a composite separator includes: a porous substrate; and a coating layer formed on one surface or both surfaces of the porous substrate, the coating layer containing inorganic particles and a core-shell organic particle binder as an organic particle binder, wherein the core-shell type latex organic particles are distributed more than inorganic particles in the direction of the surface of the coating layer, and the core-shell organic particle binder is less distributed on a bottom surface of the coating layer. That is, in the coating layer, the core-shell organic particle binder may be more present on the surface of the coating layer than on a bottom surface in contact with the porous substrate.

In addition, the present invention may provide a composite separator capable of achieving excellent properties of the present invention when the core-shell organic particle binder uses the organic particles whose core has a glass transition temperature higher than that of the shell, and thus is preferred. The conditions in which the core has a glass transition temperature of 50 to 80° C. and the shell has a glass transition temperature of 0 to 30° C. may be more preferable because the conditions above are preferable for achieving the effect of the present invention.

In addition, the present invention includes the coating layer further including various single layer organic particles in addition to the core-shell organic particle binder and the inorganic particles, as long as the coating layer achieves the object of the present invention.

In the present invention, the size of the inorganic particles is not particularly limited. However, it is preferable to use particles having an average particle diameter of 10 nm to 5 μm alone, or to mix with particles having different sizes. The inorganic particle binder may more preferably include first inorganic particles having an average particle diameter of less than 1 fan and second inorganic particles having an average particle diameter of 1 to 3 fan at a weight ratio of 0.1:99.9 to 10:90.

In the present invention, when the coating layers of each composite separator face each other, are compressed at room temperature and a pressure of 4.7 MPa for 1 minute, and are then subjected to a 180° peel test, the composite separator may have a peel strength of 25 gf/25 mm or less, and particularly, 10 to 25 gf/25 mm.

In addition, the present invention may provide a composite separator for a secondary battery in which a Gurley permeability of the composite separator of the present invention satisfies the following Equation 3 and a Gurley permeability change rate (ΔP) of the composite separator of the present invention satisfies the following Equation 4:

$$G_1 \leq 300 \qquad \text{[Equation 3]}$$

$$10\% \leq \Delta P \leq 50\% \qquad \text{[Equation 4]}$$

wherein $\Delta P = (G_2 - G_1)/G_1 \times 100$, $G_2$ is the Gurley permeability measured according to JIS P8117 in a state in which the composite separator is laminated on a Teflon sheet so that the coating layer of the composite separator faces the Teflon sheet, the composite separator and the Teflon sheet are compressed at 90° C. and 35 MPa, and the Teflon sheet is then removed, $G_1$ is the Gurley permeability of the composite separator before fusion, and a unit of the Gurley permeability is sec/100 cc.

In addition, the present invention may provide the composite separator for the secondary battery in which when the composite separator of the present invention is laminated on carbon sheet so that the coating layer of the composite separator faces the carbon sheet, the composite separator and the carbon sheet are compressed at 90° C. and 35 MPa, and then are subjected to a 180° peel test, the composite separator has a fusing force of peel strength of 40 gf/25 mm or more.

In another general aspect, there is provided an electrochemical device comprising a battery including the composite separator.

In addition, another aspect of the present invention may provide an electrode-composite separator assembly in which the surface of the coating layer of the composite separator of the present invention and electrode are face-to-face integrated with each other and an electrochemical device comprising the same.

Other features and aspects will be apparent from the following detailed description, the drawings, and the claims.

BRIEF DESCRIPTION OF THE DRAWINGS

FIG. 1 is a cross-sectional photograph showing a composite separator according to Example 1 of the present invention.

DETAILED DESCRIPTION OF EMBODIMENTS

The advantages, features, and aspects of the present invention will become apparent from the following description of the embodiments with reference to the accompanying drawings, which is set forth hereinafter. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

The following examples and comparative examples are only a reference for describing the present invention in detail, and the present invention is not limited thereto, and may be implemented in various forms.

In addition, all technical terms and scientific terms have the same meanings as those commonly understood by a person skilled in the art to which the present invention pertains unless otherwise defined.

In addition, singular forms used in the specification and the appended claims are intended to include the plural forms as well unless otherwise indicated in context.

Hereinafter, the term "core-shell organic particle binder" used herein refers to organic particles in which a core layer and a shell layer surrounding the core layer present. In addition, the core-shell organic particle binder may be spherical organic particles.

The present inventors have found that various effects described in the section of the effect of the present invention such as when mixed particles of inorganic particles and core-shell latex organic particles are applied to form a coating layer, the core-shell organic particle binder is less present on the bottom surface of the coating layer in contact with a porous substrate as compared to the surface of the coating layer; when the content of the organic particles is increased in the direction of the surface, adhesion between an electrode and a separator is improved, thereby improving distortion or a lifting phenomenon in the preparation of an electrode-composite separator assembly; and cycle characteristics of the battery are excellent and a desired high capacity may be achieved, may be obtained. Thus, the present invention has been completed.

More preferably, the present inventors have found that in using the core-shell organic particle binder as the binder, the core-shell organic particle binder having a structure in which the core has a glass transition temperature higher than that of the shell is used as the binder, such that not only adhesion between the electrode and the separator is more excellent, but also an air permeability is excellent. Thus, the present invention has been completed.

Further, more preferably, even when the core-shell organic particle binder is used in an amount of 40 wt. % or less, the object of the present invention can be sufficiently achieved.

In addition, the coating layer further includes a single layer organic particle binder having the glass transition temperature lower by 10 to 60° C. than that of the shell layer of the core-shell organic particle binder, thereby achieving more excellent physical properties of shrinkage or a fusing force.

Therefore, according to an aspect of the present invention, a composite separator includes a porous substrate; and a coating layer formed on the porous substrate, the coating layer containing inorganic particles and a core-shell organic particle binder, wherein in the coating layer, the core-shell organic particle binder is more present on a surface of the coating layer than on a bottom surface in contact with the porous substrate.

In addition, according to an aspect of the present invention, a composite separator includes a porous substrate; and a coating layer formed on the porous substrate, the coating layer containing an inorganic particles and a core-shell organic particle binder, wherein in the coating layer, the core-shell organic particle binder is more present on a surface of the coating layer than on a bottom surface in contact with the porous substrate, and the glass transition temperature of the core layer is higher than that of the shell layer.

In addition, according to an aspect of the present invention, a composite separator includes a porous substrate; and a coating layer formed on one surface or both surfaces of the porous substrate, the coating layer containing inorganic particles and a core-shell organic particle binder, wherein the core-shell particle organic binder is less present on the bottom surface in contact with the substrate layer of the coating layer and the amount of the core-shell organic particle binder is increased in the direction of the surface layer which is the opposite side of the bottom surface of the coating layer.

In addition, according to an aspect of the present invention, a composite separator includes a porous substrate; and a coating layer formed on one surface or both surfaces of the porous substrate, the coating layer containing inorganic particles and a core-shell organic particle binder, wherein the core-shell particle organic binder is less present on the bottom surface in contact with the substrate layer of the coating layer and the amount of the core-shell organic particle binder is increased in the direction of the surface layer which is the opposite side of the bottom surface of the coating layer, and the glass transition temperature of the core layer is higher than that of the shell layer.

In addition, an aspect of the present invention relates to an electrochemical device such as a lithium secondary battery including the composite separator.

The present invention also provides a method of preparing a composite separator for forming a coating layer having the above characteristics.

In the present invention, as described above, the coating layer in which the core-shell organic particle binder is more present on the surface of the coating layer than on a bottom surface contacting the porous substrate, is not prepared by using conventional coating methods such as bar coating, dip coating, and spray coating, and it is necessary to coat the upper surface of the porous substrate with the coating composition and then allowed to stand for a predetermined time to allow for an induction time in order to obtain the structure of the coating layer of the present invention. That is, it is possible now by adjusting the viscosity of the coating composition so as to ensure fluidity due to the difference in specific gravity between the inorganic particles and the organic particles, and also by allowing for an induction time in order to obtain a laminated structure of the present invention, before applying (coating) the coating composition of which viscosity is adjusted to the upper surface of the porous substrate and then drying.

In the case of coating and drying immediately without considering variable viscosity adjustment and an induction time within the short time of the present invention, fluidity to the gravity of the particles is insufficient, and organic particles still present on the bottom surface of the coating layer, which adversely affects the electrode characteristics. Particularly, there is a fatal disadvantage in the adhesion to the electrode, such that the capacity, characteristics and lifetime of the battery are deteriorated due to a lifting phenomenon.

In the present invention, the viscosity may be adjusted by the contents of inorganic and organic materials. In the present invention, the inorganic and organic materials so that the solid content is 30 wt. % or less, preferably 20 wt. % or less, and more preferably 15 wt. % or less may be prepared, coated, after an induction time of 1 minute or more, and preferably 5 minutes or more, transferred to a drying zone, and then dried to form a coating layer having the structure of the present invention.

However, coating conditions of the present invention are not limited as long as it is a coating layer in which the core-shell organic particle binder is increased in the direction of the surface layer, which is the opposite side of the bottom surface of the coating layer, while the core-shell organic particle binder is not present or is less present on the bottom surface in contact with the substrate layer of the coating layer intended in the present invention.

As an aspect, the coating layer may further include single layer latex organic particles having the glass transition temperature lower by 10 to 60° C. than that of the shell layer of the core-shell organic particle binder.

As an aspect, in the core-shell organic particle binder, the core may have the glass transition temperature of 50 to 80° C. and the shell may have the glass transition temperature of 0 to 30° C.

As an aspect, in the core-shell organic particle binder, both a core layer and a shell layer may consist of an acrylic polymer.

As an aspect, the single layer latex organic particles may consist of an acrylic polymer.

As an aspect, the core-shell organic particle binder may satisfy the following Equations 1 and 2:

$$50 \leq r3 \leq 600 \quad \text{[Equation 1]}$$

$$4 \leq r2/r1 \leq 16 \quad \text{[Equation 2]}$$

wherein r1 is a radius of the core, r3 is a radius of the core-shell organic particle binder, r2 is a length obtained by subtracting the radius of the core from the radius of the core-shell organic particle binder, and a unit of the radius is nm.

As an aspect, the coating layer may include 60 to 90 wt. % of the inorganic particles and 10 to 40 wt. % of the organic particle binder, wherein the organic particle binder may include the core-shell organic particle binder alone, or the core-shell organic particle binder and the single layer latex organic particles.

As an aspect, the organic particle binder may include the core-shell latex particles and the single latex particles at a weight ratio of 10:90 to 90:10.

As an aspect, the inorganic particles may be first inorganic particles having an average particle diameter of less than 1 μm alone, or may be mixed particles of the first inorganic particles and second inorganic particles having an average particle diameter of 1 to 3 μm.

As an aspect, the inorganic particles may include the first inorganic particles having an average particle diameter of less than 1 μm and the second inorganic particles having an average particle diameter of less than 2 to 3 μm at a weight ratio of 0.1:99.9 to 10:90.

As an aspect, the composite separator may have shrinkage of 7% of less in the machine direction and the transverse direction after maintaining at 130° C. for 1 hour.

As an aspect, a Gurley permeability of the composite separator may satisfy the following Equation 3 and a Gurley permeability change rate (ΔP) of the composite separator may satisfy the following Equation 4:

$$G_1 \leq 300 \quad \text{[Equation 1]}$$

$$10\% \leq \Delta P \leq 50\% \quad \text{[Equation 2]}$$

wherein $\Delta P = (G_2 - G_1)/G_1 \times 100$, $G_2$ is the Gurley permeability measured according to JIS P8117 in a state in which the composite separator is laminated on a Teflon sheet so that the coating layer of the composite separator faces the Teflon sheet, the composite separator and the Teflon sheet are compressed at 90° C. and 35 MPa, and the Teflon sheet is then removed, $G_1$ is the Gurley permeability of the composite separator before fusion, and a unit of the Gurley permeability is sec/100 cc.

As an aspect, when the composite separator is laminated on carbon sheet so that the coating layer of the composite separator faces the carbon sheet, the composite separator and the carbon sheet are compressed at 90° C. and 35 MPa, and then are subjected to a 180° peel test, the composite separator may have a peel strength of 40 gf/25 mm or more.

Another aspect of the present invention is an electrochemical device comprising the composite separator according to the above aspect.

In the present invention, the coating layer may also consist of at least one layer, and more specifically, the coating layer may consist of, for example, single layer or a multilayer of two or more layers. When the coating layer consists of multilayer, the binder constituting of each layer may be identical to or different from each other.

In an aspect of the present invention, the porous substrate is not limited as long as it is usually used as a separator of a secondary battery.

For example, the porous substrate may be a woven fabric, a non-woven fabric, a porous film, or the like. In addition, the porous substrate may also be a single layer or multilayer in which two or more layers are laminated. The material of the porous substrate is not limited, but specifically, may be, for example, formed of any one or a mixture of two or more selected from the group consisting of polyethylene, polypropylene, polybutylene, polypentene, polymethylpentene, polyethylene terephthalate, polybutylene terephthalate, polyacetal, polyamide, polycarbonate, polyimide, polyether sulfone, polyphenylene oxide, polyphenylene sulfide, polyethylene naphthalene, and a copolymer thereof.

A thickness of the porous substrate is not limited, and may be usually 1 to 100 μm, specifically 5 to 80 μm, and more preferably 10 to 50 μm, which is a range used in the art, but is not limited thereto.

The porous substrate may also include one or multiple heat-resistant layers. The heat-resistant layer may be a layer consisting of a high heat-resistant polymer material having a high heat-resistance, and may include inorganic particles. Specifically, the high heat-resistant polymer material may be, for example, selected from fluorine-based polymers such as polyvinylidene fluoride; polyamide-based or polyimide-based polymers such as polyamide 6, polyamide 66, polyamide 11, polyamide 12, aromatic polyamide, polyimide, or the like. However, the heat-resistant polymer material is not limited as long as it is a heat-resistant polymer commonly used in the art.

As the inorganic particles, specifically, for example, any one or a mixture of two or more selected from calcium carbonate, talc, clay, kaolin, silica, hydrotalcite, diatomite, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, glass, or the like may be used, but is not limited thereto.

Next, the coating layer will be described in more detail.

In an aspect of the present invention, the coating layer may improve an adhesive property between the electrode and the separator to prevent distortion or a lifting phenomenon between the electrode and the separator in the preparation of the electrode assembly, thereby maximizing the capacity of the battery.

In addition, the coating layer is allowed to adhere in such a range that the permeability of the porous substrate is not significantly impaired, such that the inherent permeability of the separator may be maintained to the maximum even after the composite separator is fused on the electrode to be integrated with the electrode.

More specifically, the coating layer may mean a coating layer in which a permeability change rate (ΔP) measured according to JIS P8117 using a densometer manufactured by Toyoseiki is maintained at 50% or less, in a state in which the composite separator is laminated on Teflon sheet so that the coating layer of the composite separator faces the Teflon sheet, the composite separator and the Teflon sheet are compressed at 90° C. and 35 MPa, and the Teflon sheet is then removed.

$$\Delta P(\%)=(\text{permeability after fusion}-\text{permeability before fusion})/\text{permeability before fusion}\times 100$$

This characteristic is caused by a structure of the coating layer in which the core-shell organic particle binder is increased in the direction of the surface layer which is the opposite side of the bottom surface of the coating layer, while the core-shell organic particle binder is less present on the bottom surface in contact with the substrate layer of the coating layer according to the present invention.

More specifically, the coating layer is prepared by containing the inorganic particles, and the core-shell organic particle binder consisting of a core-shell structure as a binder of the inorganic particles. More preferably, the effect may be further increased when in the core-shell organic particle binder, the glass transition temperature of the core is higher than that of the shell, which is preferable.

In the present invention, the coating layer contains the core-shell organic particle binder as the binder and the distribution of the particles has a structure of the coating layer of the present invention, such that even if the ratio of the binder in the coating layer increases, the problem that the binder blocks the pore of the porous substrate to lower the air permeability may be avoided or minimized, which is preferable.

Meanwhile, when single structure of latex-type binder having a low glass transition temperature without the core-shell structure is only used, a fusing force and heat-resistance may not be achieved at the same time, which is not preferable. That is, any one of heat-resistance and a fusing force may be satisfied, but it is difficult for both of these characteristics to be satisfied at the same time.

In addition, when the glass transition temperature of the shell is higher than that of the core while having a core-shell structure, a fusing force tends to be somewhat low at a temperature below the temperature for fusing the shell, and also the performance of the battery may be poor, as compared to the opposite case. However, physical properties of the present invention may be achieved under appropriate conditions, and thus the above conditions may be included in the scope of the present invention.

Thus, when the glass transition temperature of the core is higher than that of the shell while simultaneously being subjected to a pressure and a temperature higher than the glass transition temperature of the shell by adjusting the core-shell ratio in the core-shell organic particle binder, a fusing force with the electrode may be exhibited, the physical properties having characteristics that permeability does not increase by more than 50% in comparison with the permeability of the porous substrate before fusion may be achieved, and heat-resistance may be exhibited due to the core having a high glass transition temperature, which is exposed after the shell has melted. Therefore, since the effect of the present invention may be achieved well, the above conditions are very preferable in terms of the significant effect.

More specifically, for example, the core may have a glass transition temperature of 50 to 80° C. and the shell may have a glass transition temperature of 0 to 30° C. In the temperature range as described above, an anti-blocking property is sufficiently exhibited, a fusing force is also excellent, and the battery is excellent in terms of electrical characteristics and efficiency or durability. However, the present invention is not necessarily limited thereto.

In addition, the core-shell organic particle binder may preferably satisfy the following Equations 1 and 2:

$$50 \leq r3 \leq 600 \text{ (nm)} \quad \text{[Equation 1]}$$

$$4 \leq r2/r1 \leq 16 \quad \text{[Equation 2]}$$

wherein r1 is a radius of the core, r3 is a radius of the core-shell organic particle binder, and r2 is a length obtained by subtracting the radius of the core from the radius of the core-shell organic particle binder.

In the range as described above, the binder may be sufficiently exposed to the surface to exhibit an anti-blocking property, phase-stability of the core-shell organic particle binder may be excellent, coating properties may be excellent, permeability of the porous substrate may not be significantly increased after fusing, and heat-resistance may be sufficiently satisfied.

As an aspect of the present invention, the core-shell organic particle binder may consist of other kinds of polymers in addition to the acrylic polymer, but is not excluded. However, when the core layer and the shell layer both consist of the acrylic polymer, after maintaining the composite separator at 130° C. for 1 hour, physical properties of shrinkage of 7% or less in the machine direction and the transverse direction may be achieved. Thus, the stability of the battery may be further improved, which is preferable.

Thus, in the present invention, the core layer and the shell layer of the core-shell organic particle binder may both consist of an acrylic polymer. More specifically, an acrylic monomer alone or an acrylic polymer polymerized from an acrylic monomer and a comonomer is more preferred.

The acrylic monomer may be any one or a mixture of two or more selected from (C1-C10) alkyl acrylate and (C1-C10) alkyl methacrylate. More specifically, for example, the acrylic monomer may be, but is not limited thereto, any one or a mixture of two or more selected from the group consisting of methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate, and octyl methacrylate.

The comonomer is not limited as long as it is capable of polymerizing with the acrylic monomer. Specifically, for example, a styrenic monomer and a vinylic monomer, or the like may be used, and the comonomer may be used alone or in combination of two or more. However, present invention is not limited thereto.

Specifically, for example, the styrenic monomer may be, but is not limited thereto, any one or a mixture of two or more selected from the group consisting of styrene, α-methylstyrene, p-bromostyrene, p-methylstyrene, p-ethylstyrene, m-methylstyrene, m-ethylstyrene, p-chlorostyrene, and m-chlorostyrene.

The vinylic monomer may be, but is not limited thereto, any one or a mixture of two or more selected from acrylonitrile, acrylamide, and N-vinyl-2-pyrrolidone.

In an aspect of the present invention, the core-shell organic particle binder may be prepared by a conventional method of preparing acrylic latex organic particles. For example, the core-shell organic particle binder may be prepared by methods such as emulsion polymerization or micro suspension polymerization.

The coating layer of the present invention may be formed by applying slurry containing the inorganic particles and the core-shell organic particle binder. Although not limited thereto, the content of the solid in the slurry may be variously adjusted as long as a desired coating layer of the present invention is formed depending on particle diameters, components, or the like of a solvent, inorganic particles and core-shell latex particles.

That is, the content of the solid may also be adjusted, depending on the conditions as described above, and viscosity or the induction time adjusted to prepare a coating layer having a form in which the organic particles are substantially less present on the bottom surface of the coating layer and the content of the organic particles is increased in the direction of the surface layer.

In consideration of all of the conditions as described above, the content of the solid according to the present invention may be 40 wt. % or less, preferably 30 wt. % or less, and more preferably 20 wt. % or less. The structure of the coating layer capable of achieving the desired effect of the present invention may be formed within the range as described above.

The slurry also includes a solvent as a dispersion medium in addition to the inorganic particles and the core-shell organic particle binder. The solvent may also include a co-solvent.

The solvent, which is the dispersion medium of the present invention, is not particularly limited as long as it does not dissolve the core-shell organic particle binder, and the inorganic particles and the organic particles may be settled and floated by allowing the induction time depending on the difference in viscosity or specific gravity. As examples of the solvent, any one or a mixture of two or more solvents selected from the group consisting of water, an alcohol-based solvent, an ether-based solvent, a carboxylic acid-based solvent, an organic acid ester-based solvent, a ketone-based solvent, and a dicarboxylic acid-based solvent may be used, but is not limited thereto.

Water is usually preferred. When a co-solvent is used in the case of water, the content of the co-solvent may be 1 to 50 parts by weight based on 100 parts by weight of water, but is not limited thereto.

More specifically, for example, as the alcohol-based solvent, any one or a mixture of two or more selected from the group consisting of methanol, ethanol, isopropyl alcohol, 1-butanol, 2-butanol, sec-butyl alcohol, tert-butyl alcohol, ethylene glycol, propylene glycol, and butanediol may be used, but is not limited thereto.

As the ester-based solvent, any one or a mixture of two or more selected from the group consisting of saturated aliphatic ether such as propyl ether, isopropyl ether, butyl ether, isobutyl ether, n-amyl ether, isoamyl ether, methyl butyl ether, methyl isobutyl ether, methyl n-amyl ether, methyl isoamyl ether, ethyl propyl ether, ethyl isopropyl ether, ethyl butyl ether, ethyl isobutyl ether, ethyl n-amyl ether, and ethyl isoamyl ether; unsaturated aliphatic ester such as allyl ether and ethyl allyl ether; aromatic ether such as anisole, phenetole, phenyl ether, and benzyl ether; cyclic ether such as tetrahydrofuran, tetrahydropyran, and dioxane; ethylene glycol ether such as ethylene glycol monomethyl ether, ethylene glycol monoethyl ether, ethylene glycol monobutyl ether, diethylene glycol monomethyl ether, diethylene glycol monoethyl ether, and diethylene glycol monobutyl ether may be used, but is not limited thereto.

As the carboxylic acid-based solvent, any one or a mixture of two or more selected from the group consisting of a monocarboxylic acid solvent such as formic acid, acetic acid, acetic anhydride, acrylic acid, citric acid, propionic acid, and butyric acid may be used, but is not limited thereto.

As the organic acid ester-based solvent, any one or a mixture of two or more selected from the group consisting of butyl formate, amyl formate, propyl acetate, isopropyl acetate, butyl acetate, dibutyl acetate, amyl acetate, isoamyl acetate, 2-ethylhexyl acetate, cyclohexyl acetate, butylcyclohexyl acetate, ethyl propionate, butyl propionate, amyl propionate, butyl butyrate, diethyl carbonate, diethyl oxalate, methyl lactate, ethyl lactate, butyl lactate, and triethyl phosphate may be used, but is not limited thereto.

As the keton-based solvent, any one or a mixture of two or more selected from the group consisting of acetone, ethyl ketone, propyl ketone, butyl ketone, methyl isopropyl ketone, methyl isobutyl ketone, diisobutyl ketone, acetyl acetone, diacetone alcohol, cyclohexanone, cyclopentanone, methyl cyclohexanone, and cycloheptanone may be used, but is not limited thereto.

As the dicarboxylic acid-based solvent, any one or a mixture of two or more selected from the group consisting of succinic acid, glutaric acid, adipic acid, undecane diacid, pyruvic acid, and citraconic acid may be used, but is not limited thereto.

As the inorganic particles of the present invention, any one or a mixture of two or more selected from the group consisting of zeolite and boehmite, $CeO_2$, hafnia ($HfO_2$), $SrTiO_3$, $TiO_2$, $Al_2O_3$, $ZrO_2$, $SnO_2$, CaO, ZnO, $Y_2O_3$, $Al_2O_3$, $TiO_2$, SiC, $ZrO_2$, ZnO, MgO, $SrTiO_3$, $BaTiO_3$, $CeO_2$, MgO, NiO, CaO, lithium phosphate ($Li_3PO_4$), $Pb(Zr,Ti)O_3$(PZT), $Pb1-xLaxZr1-yTiyO_3$ (PLZT), $PB(Mg_3Nb_{2/3})O_3$—$PbTiO_3$ (PMN-PT), lithium titanium phosphate-based inorganic particles, lithium aluminum titanium phosphate-based inorganic particles, lithium lanthanum titanate-based inorganic particles, lithium germanium thiophosphate-based inorganic particles, and lithium nitride-based inorganic particles may be used.

In addition, the size of the inorganic particles is not particularly limited. However, the inorganic particles having an average particle diameter of less than 1 μm is preferred, and if necessary, larger inorganic particles, for example, mixed particles mixed with inorganic particles having an average particle diameter of 1 to 3 μm may be used.

The content of the inorganic particles may be 50 to 90 wt. % of the coating layer.

In an aspect of the present invention, the slurry may further include single layer latex organic particles in addition to the binder of the core-shell structure.

In this case, the glass transition temperature of the single layer latex organic particles is lower than that of the shell of the core-shell organic particle binder, and thus the adhesion may be further improved, which is preferable. However, the present invention is not necessarily limited thereto.

In addition, the latex organic particles of the single layer particle structure are also included, and thus the binding force of the inorganic particles may be further improved. More specifically, the glass transition temperature of the latex organic particles of the single layer structure may be at least 10° C. lower, and more specifically 10 to 60° C. lower than the glass transition temperature of the shell. That is, when the shell in the core-shell organic particle binder has the glass transition temperature of 30° C., the latex organic particles of the single layer structure preferably have the glass transition temperature of 20° C. or less. In addition, the content of the latex organic particles of the single layer particle structure is preferably lower than that of the core-shell organic particle binder. More specifically, for example, the content of the latex organic particles may be 10 to 50 wt. % based on the content of the core-shell organic particle binder. In the range as described above, it is also possible to provide a composite separator having an improved adhesion between the electrode and the porous substrate, and having excellent shrinkage.

In the present invention, the binder may further include a binder dissolved in a solvent, in addition to the inorganic particles and the core-shell organic particle binder as the binder as described above. In this case, the content may be in the range of 0.001 to 5 wt. %.

In an aspect of the present invention, the slurry may further include an additive in a range not greatly lowering the applicability and the battery performance. Specifically, for example, as an additive, a viscosity regulator, a binder aid, a surfactant, or the like may be used, but is not limited thereto.

Hereinafter, a method of forming a coating layer of the present invention will be described.

In the present invention, as described above, a method of providing a coating layer in which the amount of the core-shell organic particle binder is increased in the direction of the surface layer which is the opposite side of the bottom surface of the coating layer while the core-shell organic particle binder is not present on the bottom surface of the coating layer contacting the substrate layer, is carried out by conventional coating methods such as bar coating, dip coating, spray coating, or the like as in the conventional preparation method, but requires a means for forming a coating layer having the structure of the present invention such as viscosity, solvent or induction time.

That is, in a method of forming the coating layer of the present invention, for example, it is necessary to apply the slurry of the present invention to the upper surface of the porous substrate, and then allowed to stand for a predetermine time to allow for an induction time in order to obtain the structure of the coating layer of the present invention.

That is, it is possible by adjusting the viscosity of the coating composition so as to ensure fluidity due to the difference in specific gravity between the inorganic particles and the organic particles, and also by allowing for the induction time in order to obtain the coating layer of a laminated structure of the present invention, before applying (coating) the slurry composition of which viscosity is adjusted to the upper surface of the porous substrate and then drying.

Thus, in the present invention, when the slurry is applied and the drying is started immediately as in conventional methods without adjusting the viscosity of the slurry or providing the induction time so as to be able to flow within a short time in order to minimize the induction time of the present invention, fluidity to the gravity of the particles is insufficient, and organic particles still present on the bottom surface of the coating layer, which adversely affects the electrode characteristics. Particularly, there is a disadvantage in the adhesion to the electrode, such that the capacity, characteristics and lifetime of the battery are deteriorated due to a lifting phenomenon.

In the present invention, the viscosity may be adjusted by the contents of the inorganic material and the core-shell latex particles as the binder. In the present invention, the inorganic material and the core-shell latex particles so that the solid content is 40 wt. % or less, preferably 30 wt. % or less, and more preferably 15 wt. % or less may be prepared, coated, after an induction time of 1 minute or more, and preferably 5 minutes or more, transferred to a drying zone, and then dried to form a coating layer having the structure of the present invention.

However, coating conditions of the present invention are not limited as long as it is a coating layer in which the core-shell organic particle binder is increased in the direction of the surface layer which is the opposite side of the base surface of the coating layer, while the core-shell organic particle binder is not present on the base surface in contact with the substrate layer of the coating layer intended in the present invention.

In the present invention, the phrase "there is little or no organic particles of the core-shell latex on the bottom surface of the coating layer" means that a case where a portion in which the number of the core-shell organic particle binder presents in 5% or more of the number presenting on the surface, is one or less when the total thickness of the coating layer was enlarged by 10,000 times from the bottom surface of the coating layer to the surface layer by 20% by SEM, and then 20 portions having an area of 13 μm×20 μm size were randomly observed. In the present invention, particularly preferable is a case where a portion in which the number of the core-shell organic particle binder presents in 5% or more of the number presenting on the surface, is one or less.

In an aspect of the present invention, specific examples of the coating method for forming the coating layer may include a slot die coating method, a doctor blade method, a dip method, a reverse roll method, a direct roll method, gravure method, a kiss coating method, an extrusion method, a bead method, a curtain coating method, a dot method, a porous coating method, a slot coating method, a spray method, a spiral spray method, a summit spray method, immersion, a brush application, or the like.

Specifically, a doctor blade method, a gravure method, a kiss coating method, a curtain coating method, a dot method, a porous coating method, a slot coating method, a spray method, a spiral spray method, a summit spray method, or the like may be used, but is not limited thereto.

Next, the induction time may be given, before the composition is applied and then dried. After coating, the coating layer having the structure of the present invention may be formed by transferring it to a drying zone after an induction time of 30 seconds or more, preferably 1 minute or more, and more preferably 5 minutes or more, and drying. In the present invention, the induction time of the present invention may not be necessary if the viscosity of the slurry is low and the behavior of the inorganic particles and the organic particles sufficiently occurs due to the difference in specific gravity within a sufficiently short time to have the structure of the coating layer of the present invention.

Next, the drying step will be described. The drying step may remove low boiling point materials such as a slurry solvent or a co-solvent. Examples of the drying method may include drying by hot air, hot air, low-humidity air; vacuum drying; and drying by irradiation with infrared rays, far-infrared rays, electron beams, or the like. The drying temperature may be 30 to 200° C., and more specifically 40 to 100° C.

In an aspect of the present invention, the coating layer may have a thickness of 0.005 to 100 μm, and more particularly 0.01 to 50 μm, after coating and drying.

Next, the physical properties of the composite separator of the present invention will be described.

The composite separator according to an aspect of the present invention may have shrinkage of 7% or less in the machine direction and the transverse direction after maintaining at 130° C. for 1 hour, the Gurley permeability may satisfy the following Equation 3, and the Gurley permeability change rate (ΔP) may satisfy the following Equation 4:

$G_1 \leq 300$ [Equation 3]

$10\% \leq \Delta P \leq 50\%$ [Equation 4]

wherein $\Delta P=(G_2-G_1)/G_1\times 100$, $G_2$ is the Gurley permeability measured according to JIS P8117 in a state in which the composite separator is laminated on a Teflon sheet so that the coating layer of the composite separator faces the Teflon sheet, the composite separator and the Teflon sheet are compressed at 90° C. and 35 MPa, and the Teflon sheet is then removed, $G_1$ is the Gurley permeability of the composite separator before compression, and a unit of the Gurley permeability is sec/100 cc.

In addition, when the composite separator is laminated on carbon sheet so that the coating layer of the composite separator faces the carbon sheet, the composite separator and the carbon sheet are compressed at 90° C. and 35 MPa, and then are subjected to a 180° peel test, the composite separator may have a peel strength of 40 gf/25 mm or more. More particularly, the adhesion is excellent as 40 to 90 gf/25 mm, so that it is possible to improve the occurrence of distortion or a lifting phenomenon in the manufacture of the electrode assembly. Therefore, the capacity of the battery may be maximized and a battery having excellent cycle characteristics may be provided.

Next, the electrode-composite separator assembly of the present invention will be described.

In an aspect of the present invention, the electrode-composite separator assembly means an assembly obtained by fusing a coating layer of the composite separator on the electrode and integrating them.

In an aspect of the present invention, the conditions for fusing the electrode and the coating layer are not limited. However, the electrode and the coating layer may be compressed at a temperature of 30° C. or more, more specifically, at a temperature not less than the glass transition temperature of the shell layer of the core-shell latex binder particles, and still more specifically, at a temperature of 30 to 200° C., and then integrated.

Hereinafter, the present invention will be described in more detail based on examples and comparative examples. However, the following examples and comparative examples are an example for describing the present invention in more detail, and the present invention is not limited by the following examples and comparative examples.

Hereinafter, the physical properties were measured as follows.

1. Glass transition temperature: The resins of the core layer and the shell layer were synthesized separately, and the glass transition temperature of the resin was measured by DSC.

2. Peel strength (fusing force)

The composite separator was laminated on a carbon sheet (Manufacturer: Toyo Carbon Korea, Co., Ltd., product name: PF-20HP) having a thickness of 200 μm so that the coating layer of the composite separator faces the carbon sheet, the composite separator and the carbon sheet were compressed at 90° C. and 35 MPa, and then the peel strength was measured. The peel strength was measured by a 180° peel test method using a tensile measuring apparatus (3343) manufactured by INSTRON.

3. Gurley permeability

A Gurley permeability was measured as a gas permeability. The Gurley permeability was measured according to JIS P8117 using a densometer manufactured by Toyoseiki. The time taken for 100 cc of air to pass through the area of 1 square inch of the separator was recorded in seconds, and the values were compared.

4. ΔP (Gurley permeability after fusion)

The composite separator was laminated on a Teflon sheet so that the coating layer of the composite separator faces the Teflon sheet, the composite separator and the Teflon sheet were compressed at 90° C. and 35 MPa, the Teflon sheet was removed, and then the Gurley permeability was measured according to JIS P8117 using a densometer manufactured by Toyoseiki.

5. Shrinkage

The prepared composite separator was cut into a size of width of 10 cm and length of 10 cm, sandwiched between two glass plates, allowed to stand in an oven at 130° C. for 1 hour, and then the change in length in the machine direction (MD) and the transverse direction (TD) was measured to evaluate heat shrinkage.

Shrinkage=(length before heat treatment−length after heat treatment)/(length before heat treatment)×100

6. Peel strength (anti-blocking property)

The coating layers of the two composite separators faced each other, and were compressed at room temperature and a pressure of 4.7 MPa for 1 minute. Then, it was confirmed whether or not the coating layers were stuck together, and the degree of sticking was measured by a 180° peel test method using a tensile measuring apparatus (3343) manufactured by INSTRON. The measured value should be in the range of 10 to 25 gf/25 mm because if the value exceeds the above-described value, the coating layers are stuck to each other and are peeled off at the time of unwinding, which is not preferable, and if the value is lower than the above-described value, the adhesion to the electrode surface is low, so that the coating layer is easily peeled off and the space portion is formed, whereby the electrical characteristics of the battery are poor.

7. Thickness

A TESA-Mhite product was used as a contact thickness meter with an accuracy of 0.1 μm for thickness.

Example 1

A core-shell organic particle binder (A) was prepared as a binder wherein the core-shell organic particle binder (A) consists of a core consisting of a copolymer of butyl acrylate and methyl methacrylate, and a shell consisting of a polymer of butyl acrylate, methyl methacrylate, styrene and acrylonitrile, the core has a glass transition temperature of 80° C., the shell has a glass transition temperature of 30° C., and an average particle diameter (D50) is 0.8 μm.

20 wt. % of the core-shell organic particle binder (A), 79.5 wt. % of the alumina particles having an average particle diameter of 0.6 man, and 0.5 wt. % of boehmite particles having an average particle diameter of 1.5 μm were dispersed in water to prepare a slurry. The solid content of the slurry was 18 wt. %.

The slurry was coated on both surfaces of the porous polyethylene-based substrate (SK Innovation, ENPASS) having a Gurley permeability of 150 sec/100 cc and a thickness of 9 μm at a rate of 10 m/min using a slot coating die, allowed to stand for 2 minutes, and then dried by passing through a dryer having a length of 6 m at which hot air was generated at 60° C. The thicknesses of the both surface of coating layer were 3 μma, respectively.

The physical properties of prepared composite separator were measured and are shown in Table 1 below.

Example 2

A composite separator was prepared in the same manner as in Example 1, except that 6 wt. % of the single layer latex organic particles (B) having a glass transition temperature of 10° C. and an average particle diameter (D50) of 0.2 μm, was further added as single layer particles consisting of a copolymer of butyl acrylate and methyl methacrylate, and the content of organic particles (A) having an average particle diameter of 0.8 μm was also changed from 20 wt. % to 14 wt. % to prepare a slurry in Example 1.

The physical properties of prepared composite separator were measured and are shown in Table 1 below.

Example 3

A composite separator was prepared in the same manner as in Example 1, except that a core-shell organic particle binder (C) was used, wherein the core-shell organic particle binder consists of a core consisting of a copolymer of butyl acrylate and methyl methacrylate, and a shell consisting of a ethylene-vinyl acetate copolymer, the core has a glass transition temperature of 80° C., the shell has a glass transition temperature of −20° C., and an average particle diameter (D50) is 0.8 μm, instead of the core-shell organic particle binder in Example 1.

The physical properties of prepared composite separator were measured and are shown in Table 1 below.

Example 4

A composite separator was prepared in the same manner as in Example 1, except that a core-shell organic particle binder having an average particle diameter (D50) of 0.8 μm obtained by reversely synthesizing the core and shell of Example 1, was used. The physical properties of prepared composite separator were measured and are shown in Table 1 below.

Comparative Example 1

A composite separator was prepared in the same manner as in Example 1, except that 20 wt. % of only latex organic particles having a glass transition temperature of 30° C. and an average particle diameter (D50) of 0.8 μm were used as the single layer latex particles consisting of a copolymer of butyl acrylate and methyl methacrylate in Example 1. The physical properties of prepared composite separator were measured and are shown in Table 1 below.

Comparative Example 2

A composite separator was prepared in the same manner as in Example 1, except that 20 wt. % of only latex organic particles having a glass transition temperature of 80° C. and an average particle diameter (D50) of 0.8 μm were used as the single layer latex particles consisting of a copolymer of butyl acrylate and methyl methacrylate in Example 1. The physical properties of prepared composite separator were measured and are shown in Table 1 below.

TABLE 1

|  | Example | | | | Comparative Example | |
| --- | --- | --- | --- | --- | --- | --- |
|  | 1 | 2 | 3 | 4 | 1 | 2 |
| r2/r1 | 5 | 5 | 5 | 5 | — | — |
| Fusing force (gf/25 mm) | 47 | 53 | 60 | 40 | 81 | 21 |

TABLE 1-continued

|  |  | Example | | | | Comparative Example | |
| --- | --- | --- | --- | --- | --- | --- | --- |
|  |  | 1 | 2 | 3 | 4 | 1 | 2 |
| Gurley permeability (sec/100 cc) | | 228 | 240 | 250 | 260 | 272 | 202 |
| ΔP (%) | | 39 | 44 | 48 | 41 | 80 | 30 |
| Shrinkage (%) | MD | 6.3 | 4.8 | 6.4 | 7.0 | 10.2 | 4.2 |
|  | TD | 2.0 | 1.7 | 2.6 | 2.9 | 6.8 | 1.1 |
| Anti-blocking property | o/x | o | o | o | o | x | o |
|  | Peel strength (gf/25 mm) | 20 | 22 | 24 | 17 | 35 | 8 |

As shown in Table 1, it was found that Examples 1 to 3 according to the present invention have a high fusing force, a low Gurley permeability, a very good porosity, and very excellent shrinkage and an anti-blocking property. In addition, it was found that fusion and shrinking properties were further increased when a single layer latex was further included.

However, it was found that when the glass transition temperature of the shell layer is higher than that of the core layer as in Example 4 of the present invention, a fusing force is somewhat low and shrinkage is somewhat poor, but they belong to the category of the present invention, and the anti-blocking property is very excellent.

In addition, unlike the present invention, when a single layer latex was used without using core-shell organic particles, shrinkage was poor or cohesive force was too low, and an anti-blocking property could not satisfy the physical properties harmoniously.

The composite separator for a secondary battery according to the present invention improves adhesion between the electrode and the separator when heat and pressure are applied, thereby improving distortion or a lifting phenomenon in the preparation of the electrode-composite separator assembly. Therefore, cycle characteristics are excellent and a desired capacity may be achieved.

In addition, the present invention may provide a composite separator having less heat shrinkage, and an anti-blocking property due to excellent slipperiness.

That is, according to the present invention, when heat and pressure are applied during the integration process of the electrode and the separator, a fusing force between the electrode and the separator is excellent, such that no lifting phenomenon on the electrode surface and the separator surface occurs; when the electrode and the separator are integrated with each other, the slipperiness is improved, such that assemblability between the electrode surface and the separator is improved; the composite separator is easily seated on an electrode surface due to slipperiness or the like upon assembly, such that no wrinkles occur; and no distortion or a lifting phenomenon between the electrode and the separator occurs.

In addition, the present invention may provide an electrochemical device such as a secondary battery, having an effect of reducing pores between an electrode and a separator and having lifetime improvement through prevention of a lifting phenomenon and ease alignment.

In addition, an object of the present invention is to provide a composite separator in which cycle characteristics are excellent, and a battery capable of achieving a desired high capacity may be prepared by the above-described advantages.

In addition, an object of the present invention is to provide a composite separator which sufficiently gives the above-described characteristics without significantly lowering permeability of a separator.

Further, an object of the present invention is to provide a composite separator in which the occurrence of shrinkage is reduced and a blocking phenomenon between coating layers may be improved upon winding a prepared product.

What is claimed is:

1. A composite separator comprising:
   a porous substrate; and a coating layer having a side in contact with the porous substrate, the coating layer containing inorganic particles and a core-shell organic particle binder,
   wherein, in the coating layer, the amount of the core-shell organic particle binder is larger on a side of the coating layer that is opposite to the side in contact with the porous substrate,
   wherein the core-shell organic particle binder includes organic particles including a core layer and a shell layer surrounding the core layer, and a glass transition temperature of the core layer is higher than the glass transition temperature of the shell layer,
   wherein the core layer has a glass transition temperature of 50 to 80° C. and the shell layer has a glass transition temperature of 0 to 30° C. and wherein both the core layer and the shell layer consist of an acrylic polymer.

2. The composite separator of claim 1, wherein the coating layer further includes a single layer organic particle binder.

3. The composite separator of claim 1, wherein the inorganic particles include first inorganic particles having an average particle diameter of less than 1 μm.

4. The composite separator of claim 1, wherein the coating layer includes 50 to 90 wt. % of the inorganic particles and 10 to 40 wt. % of the core-shell organic particle binder.

5. The composite separator of claim 2, wherein the coating layer includes 50 to 90 wt. % of the inorganic particles and 10 to 40 wt. % of an organic particle binder,
   wherein the organic particle binder includes the core-shell organic particle binder and a single layer organic particle binder at a weight ratio of 10:90 to 90:10.

6. The composite separator of claim 1, wherein the core-shell organic particle binder satisfies the following Equations 1 and 2:

$$50 \leq r3 \leq 600$$

$$4 \leq r2/r1 \leq 16$$

wherein r1 is a radius of the core layer, r3 is a radius of the core-shell organic particle binder, r2 is a length obtained by subtracting the radius of the core layer from the radius of the core-shell organic particle binder, and a unit of the radius is nm.

7. The composite separator of claim 1, wherein when the coating layers of the two composite separators face each other, are compressed at room temperature and a pressure of 4.7 MPa for 1 minute, and are then subjected to a 180° peel test, the composite separator has a peel strength of 10 to 25 gf/25 mm.

8. The composite separator of claim 1, wherein a Gurley permeability of the composite separator satisfies the following Equation 3, and a Gurley permeability change rate (ΔP) of the composite separator satisfies the following Equation 4:

$$G_1 \leq 300$$

$$10\% \leq \Delta P \leq 50\%$$

wherein $\Delta P=(G_2-G_1/G_1\times100$, $G_2$ is the Gurley permeability measured according to JIS P8117 in a state in which the composite separator is laminated on a PTFE sheet so that the coating layer of the composite separator faces the PTFE sheet, the composite separator and the PTFE sheet are compressed and fused to each other at 90° C. and 35 MPa, and the PTFE sheet is then removed, $G_1$ is the Gurley permeability of the composite separator before fusion, and a unit of the Gurley permeability is sec/100 cc.

9. The composite separator of claim 1, wherein when the composite separator is laminated on carbon sheet so that the coating layer of the composite separator faces the carbon sheet, the composite separator and the carbon sheet are compressed at 90° C. and 35 MPa, and then are subjected to a 180° peel test, the composite separator has a peel strength of 40 gf/25 mm or more.

10. An electrochemical device comprising the composite separator of claim 1.

* * * * *